Sept. 1, 1959           T. H. STIEBEL           2,902,581
MINIATURE IMMERSION HEATER WITH ELECTRIC
CONTROLLER SEALED IN HANDLE
Filed July 3, 1957

INVENTOR
THEODOR H. STIEBEL
BY
ATTORNEY

United States Patent Office 2,902,581
Patented Sept. 1, 1959

2,902,581

MINIATURE IMMERSION HEATER WITH ELECTRIC CONTROLLER SEALED IN HANDLE

Theodor H. Stiebel, Holzminden (Weser), Germany

Application July 3, 1957, Serial No. 669,784

7 Claims. (Cl. 219—41)

The instant invention relates to immersion heaters, and more particularly to the so-called "miniature" immersion electric heaters for heating quickly relatively small quantities of liquids, for example water.

An object of the instant invention is to provide a thermally responsive means which on reaching a first elevated temperature by the electrical heating coil of an immersion heater will open the electric circuit of the coil and which on cooling below a second temperature lower than the first temperature will automatically reconnect the coil to its circuit.

Another object of the invention is to provide a thermally responsive device for energizing and deenergizing a heating coil automatically which is in intimate contact with the heating coil and responds to energize the heating coil at a temperature considerably lower than that at which is responds to deenergize the coil, the lower temperature preferably being of such magnitude that the liquid, within which the immersion heater is positioned, is above normal temperature.

Still another object of the invention is to provide a miniature immersion heater with an automatic controller switch connecting the electric line supply with the heating coil of which the probe is intimately associated with the heating coil shanks extending from a heat insulated handle, and of which the switch element per se is wholly within the handle, thereby preventing tampering with the adjustment of the controller and protecting it from injury.

Still a further object of the invention is to facilitate the water-proof construction of immersion heaters by avoiding all apertures in the handles through which movable parts project, the switching elements being wholly within the handle so that all but the thermal probe fixed tubing and the heating coil fixed shanks extend therefrom.

Still another object of the instant invention is to secure an immersion heater against heating to such high temperature, after the liquid in which it had been immersed has boiled away, that damage cannot be caused to the container for the liquid or to the heater itself.

Still another object of the invention is to provide a controller of which the switching element is acted upon directly by the thermally responsive material without the intervention of any intermediate levers or other members.

The foregoing objects and features, as well as others, will more clearly appear from the following description of an illustrative embodiment of the instant invention in conjunction with the appended drawing, in which.

Figure 1:
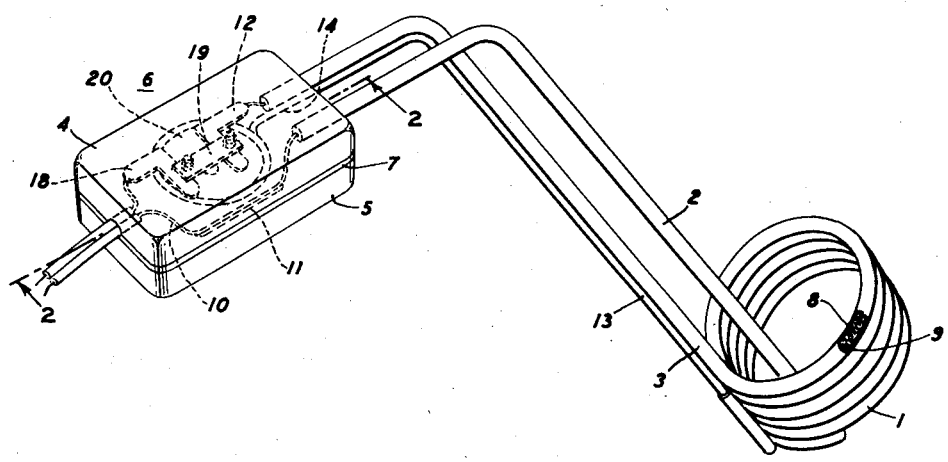
Figure 1 is a perspective view of the miniature or pocket type immersion heater of the invention with the elements within the handle shown in dashed lines.

The immersion heater comprises a coil 1 of heat conductive tubing with integral straight portions or shanks 2 and 3, extending upwardly from the respective ends of the coil, the upper ends of the shanks being clamped between the top 4 and bottom 5 of handle 6 when the latter is assembled with the intermediate formed plate 7 by any well known means such as bolts and nuts, rivets, etc. Within the tubing coil 1 and shanks 2, 3, a heater wire 8 is insulated therefrom by powdered insulation 9, such as magnesium oxide, quartz, or silica, in prior known manner. One end of the heating wire 8 is connected by insulated connecting wire 10, extending, by way of a formed groove 11 in the inner portion of the handle top 4, through the handle, to one side of the line supply, while the other end of the heating wire is connected to a terminal 12.

To the outer surface of the turns of heating coil 1, at the region thereof from which integral straight shank 3 extends upwardly from its uppermost turn, a tube 13 is attached, as by welding, and extends the length of the shank 3 closely adjacent thereto and with it into handle 6, continuing through a groove 14 in bottom 5 preferably to, and opening into, the lowermost point of a depression 15 therein. Obviously tube 13 may extend closely adjacent to shank 2, extending upwardly from the lowermost turn of coil 1, and may in either case have its lower end attached to the inner surface of the coil turns at such region. Tube 13 is filled with a thermally expansible liquid.

The interior central chamber 16 formed by the assembled top 4 and bottom 5 of the handle is large enough to accommodate the switching elements of the controller and to permit them to be actuated. The formed intermediate plate 7 of the handle, of an electrically and thermally insulating plastic, as are top 4 and bottom 5, extends through the chamber 16, dividing it into an upper and a lower portion, with only the central aperture 17 therein interconnecting the two portions. The terminal 12, connected to one end of the heating wire 8, as above stated, and terminal 18 spaced therefrom and connected to the other side of the line supply, are both spatially fixed in the upper portion of chamber 16, being normally bridged by the spring biased conductive bridge 19.

Figure 2:
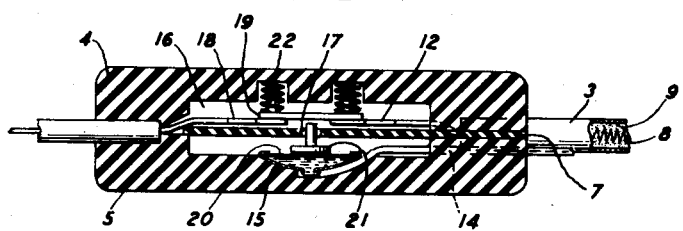
Figure 2 is a section on line 2—2 of Figure 1, showing the regulator switch in the closing position for energizing the heating coil.
Figure 3:
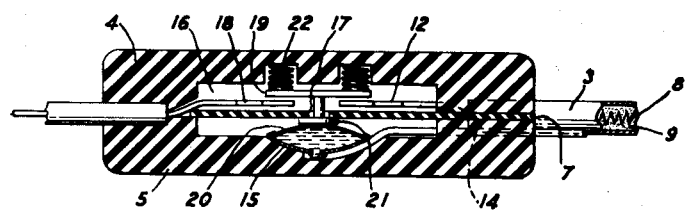
Figure 3 is the section of Figure 2 with the regulator switch in the circuit opening position.

The flexible and expansible membrane 20 has its periphery affixed to the rim of depression 15, thereby sealing the upper face thereof. Thus the interior of tube 13 and depression 15 form a continuous container for the thermally responsive liquid which is filled so that a room temperature membrane 20 is flat with all its portions coplanar. The horizontal base of an inverted T-shape button 21 rides upon the membrane 20 with vertical stem portion extending through aperture 17 in intermediate plate 7. The length of the vertical stem portion of the button is such that with membrane 20 flat, the upper end of stem portion does not engage bridge 19, as shown in Figure 2, and that with the membrane 20 bulging upward sufficiently due to the expansion of the confined thermally responsive liquid in predetermined amount, the inverted T-member engages bridge 19 and pushing it against the bias of its springs 22, ultimately disengages bridge from terminals 12 and 18 to disconnect the line supply from the heater coil, at the predetermined temperature, as shown in Figure 3. With cooling of the thermally responsive liquid the membrane 20 contracts to its minimum possible size (temperature conditions permitting) permitting button 21 to drop with it and ultimately away from bridge 19 which thus under its spring bias reconnects terminals 12 and 18 to reenergize the heating coil. Obviously the vertical portion of button 21 must be of such length that even were the membrane 20 to sag below the position where all its portions were coplanar, due for example to aging thereof, that its upper end will not disengage from aperture 17.

Because of the direct operation of the switch 21, 19 by the thermal liquid, it will be noted that the disconnect operation on a dry heating of the immersion heater is extremely short after the commencement of the dry run, being of the order of 1 second to 2 seconds, while the subsequent time of disconnection before reenergization is of the order of two minutes, allowing ample time for observation of the dry condition and complete manual disconnection of the line supply by pulling out the core of the immersion heater.

Obviously the switching or regulator elements of the instant invention are simple in conception and execution, requiring minimum precise dimension, and are relatively inexpensive. While in the described embodiment I have shown the probe tube 14 external to the heating coil shanks, obviously it could be disposed therewithin, thereby further reducing the number of openings through the handle and further simplifying the problem of making it watertight. In a specific construction of the illustrative embodiment the tubing 1 had an outer diameter of $11/64"$, the number of turns of the coil was 4 with an outer diameter of $1 1/8"$, the overall length of the shanks and coil from the adjacent side of the handle was $4 3/8"$, the handle had a length of $1 3/4"$ and a height of $7/16"$, and tube 13 an outside diameter of $1/16"$. With a load of about 45 watts per running inch on this specimen, the above connect and disconnect times after commencement of the dry run were obtained. Obviously with tubing of such diameter housing the heating wire, as compared to the much larger diameters of the prior art, the heating efficiency of the instant miniature heater under similar conditions is a multiple of that of prior art heaters due to the thinner layer of insulation (magnesium oxide) and the less energy required to heat the heater per se. This improvement in heat transmission has a noticeable effect, after energization of the heater, in the greatly decreased time of heating the heater element, as also in that after its disconnection there is a decreased after-heat effect and the subsequent temperature increase due to such effect is less.

What I claim is:

1. An electric immersion heater comprising a heating coil, a metal tubing housing the heating coil and having a pair of shanks extending parallel to each other in the same direction from the coil end thereof, a non-conductive enclosing handle of rigid material at the free end of the shanks, the handle having a cavity therewithin, a pair of fixed terminals spaced from each other within the cavity and electrically between one end of the heating coil and one side of the supply line, the other end of the heating coil being connected within the handle to the other side of the supply line, a movable conductive member within the cavity and bridging the terminals of the pair, the movable conductive member being spring biased normally to engage the terminals, a formed depression within the cavity, a flexible diaphragm tensioned across the depression, a metal tube closed at one end adjacent to the heating coil and extending to, and opening into the depression at its other end, a thermally expansive liquid having a relatively high coefficient of thermal expansion within the metal tube in such amount that on expansion it presses the diaphragm outwardly from the depression into the cavity, and a movable switching member cooperating with the diaphragm and on outward movement thereof to engage the movable bridging member against its spring bias to disengage the latter from the pair of terminals.

2. An electric immersion heater according to claim 1 in which the metal tube containing the thermally expansible liquid is heat conductively attached to the coiled end of the metal tubing and extends parallel to the shanks and closely adjacent to one of the shanks.

3. An electric immersion heater according to claim 1 in which the movable switching element is of inverted T-shape, the bottom arm of which rests on the diaphragm on the cavity side thereof and the middle arm of which extends toward the conductive bridging member and is of such length that on the heating coil attaining a predetermined high temperature the switching element disengages the bridging member from both terminals of the pair.

4. An electric immersion heater according to claim 1 in which the movable switching element is of inverted T-shape, the cross-arm of which rests on the diaphragm on the cavity side thereof and the vertical arm of which extends toward the conductive bridging member, and a plate extending through the cavity and dividing the cavity into an upper and lower region has a central aperture through which the vertical arm of the inverted T-shaped switching element extends, the vertical arm being of such length that at all times it is guided by and does not leave the aperture and its upper end is disengaged from the conductive bridging member normally and engages the bridging member with increasing coil temperature to move the bridging member from engagement with the terminals of the pair on the coil attaining a predetermined high temperature.

5. An electric immersion heater comprising a heating coil, an insulating handle connected at one end to the coil, temperature control means completely enclosed within a formed cavity within the handle, a probe containing a thermally expansible liquid extending from the handle to the coil and in juxtaposition with the coil, and means connecting the temperature control means within the cavity directly actuating the control means by the expansible liquid to deenergize the heating coil on its attaining a first predetermined high temperature and to reenergize the heating coil on cooling to a second predetermined temperature less than the first predetermined temperature.

6. An electric immersion heater according to claim 5 in which the temperature control means include a movable, spring-biased, conductive bridge normally interconnecting a pair of spaced terminals within the handle cavity, and the means connecting the temperature control means to the expansible liquid is a flexible diaphragm and a switch member cooperating with the diaphragm and the bridge and normally disengaged from the bridge.

7. An electric immersion heater according to claim 5 in which the first predetermined high temperature is not less than the boiling temperature of the liquid being heated.

References Cited in the file of this patent

UNITED STATES PATENTS

| | | |
|---|---|---|
| 1,833,996 | Johnstone et al. | Dec. 1, 1931 |
| 2,369,986 | Schaefer | Feb. 20, 1945 |
| 2,576,688 | Landgraf | Nov. 27, 1951 |
| 2,732,478 | Stiebel | Jan. 24, 1956 |